United States Patent [19]

Hayashi et al.

[11] 4,445,705
[45] May 1, 1984

[54] STAND DEVICE FOR TWO-WHEELED VEHICLES

[75] Inventors: Tsutomu Hayashi, Tokyo; Akira Shigihara, Saitama, both of Japan

[73] Assignee: Honda Giken Kogyo Kabushiki Kaisha, Tokyo, Japan

[21] Appl. No.: 392,359

[22] Filed: Jun. 25, 1982

[30] Foreign Application Priority Data

Jun. 30, 1981 [JP] Japan ................................. 56-102514

[51] Int. Cl.³ .............................................. B62H 1/02
[52] U.S. Cl. ..................................... 280/302; 180/219
[58] Field of Search ................ 180/219; 280/293, 295, 280/296, 298, 299, 300, 301, 302, 303; 248/352

[56] References Cited

U.S. PATENT DOCUMENTS 4,073,505  2/1978  Yamazaki ............................ 280/301
4,223,906  9/1980  Gratza ................................. 280/301

FOREIGN PATENT DOCUMENTS 544415  6/1956  Italy ..................................... 280/301

*Primary Examiner*—Joseph F. Peters, Jr.
*Assistant Examiner*—D. Lynn Fugate
*Attorney, Agent, or Firm*—Irving M. Weiner; Pamela S. Burt; John L. Shortley

[57] ABSTRACT

A stand device for two-wheeled vehicles having a rear fork pivotable with respect to a vehicle body, including a main stand member pivoted at a base end thereof to the vehicle body frame. The stand device includes a roller which is supported by either the main stand member or the rear fork, and a cam member having a cam surface for abutment and engagement with the roller is attached to the other of the members so that the rear fork is moved pivotally upwardly in response to a downward erecting operation for the main stand, whereby the main stand erecting operation can be performed more easily than has heretofore been possible.

5 Claims, 8 Drawing Figures

STAND DEVICE FOR TWO-WHEELED VEHICLES

BACKGROUND OF THE INVENTION

1. Field of the Invention

The present invention relates generally to a stand device for two-wheeled vehicles. More particularly, the invention relates to a stand device for two-wheeled vehicles which facilitates the operation of downwardly erecting a main stand.

2. Description of Relevant Art

In two-wheeled vehicles, particularly in motorcycles having relatively large displacement and weight, the operation of downwardly erecting a main stand requires a strong force and skill for even a relatively strong person. Even in motorcyles having a relatively small displacement and light weight, such operation involves difficulty for persons of relatively lesser strength.

The present invention effectively overcomes the foregoing problem attendant the stand erecting operation in convention main stands of two-wheeled vehicles.

SUMMARY OF THE INVENTION

The present invention provides a stand device for two-wheeled vehicles comprising a vehicle body frame, a main stand member pivoted at a base end thereof to the vehicle body frame, a rear wheel support member also pivoted at a base end thereof to the vehicle body frame, and urging means for moving the rear wheel support member pivotally upwardly in response to a pivotal downward movement of the main stand member, the urging means being disposed between the main stand member and the rear wheel support member. The rear wheel support member urging means comprises a roller supported by either the main stand member or the rear wheel support member and a cam member integrally provided on the other of the two members.

It is an object of the present invention to provide a stand device for two-wheeled vehicles which facilitates the operation of downwardly erecting a main stand.

Another object of the present invention is to provide a stand device for two-wheeled vehicles which permits shortening of the main stand length.

It is a further object of the present invention to provide a stand device for two-wheeled vehicles whereby the operation for downwardly erecting a main stand can be performed with a substantially uniform force from beginning to end.

The above and further objects, details and advantages of the present invention will become apparent from the following detailed description of a preferred embodiment of the invention when read in conjunction with the accompanying drawings.

DETAILED DESCRIPTION OF PREFERRED EMBODIMENTS

Figure 1:
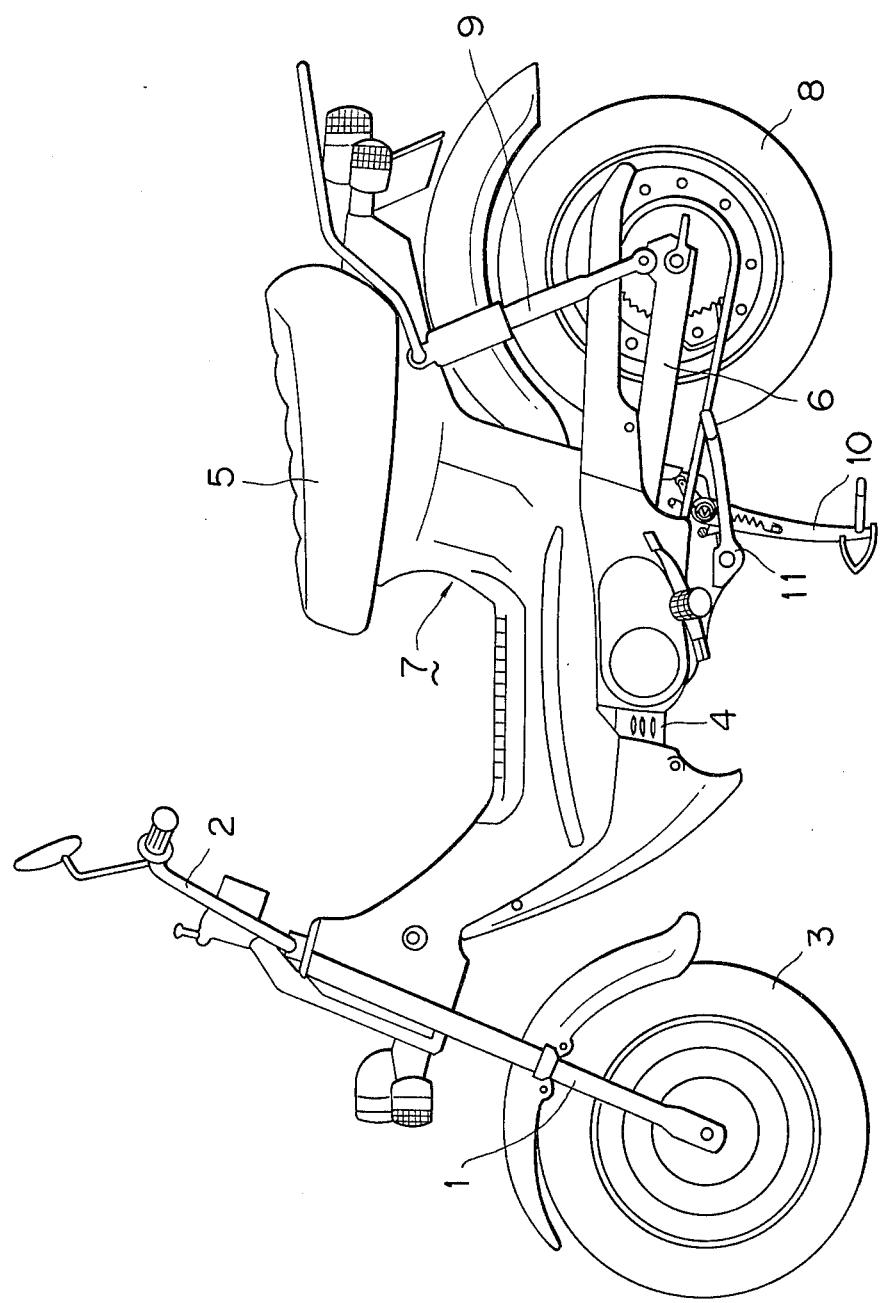
FIG. 1 is a side view of a motorcycle.

With reference to FIG. 1, there is shown a motorcycle including a front fork 1 connected to a handlebar 2, a front wheel 3 connected to the lower end of the front fork 1, an engine 4, a seat 5 and a rear fork 6 pivotably attached to a vehicle body 7. Connected to an end portion of the rear fork 6 is a rear wheel 8 which is elastically supported on the vehicle body 7 through a rear cushion unit 9. Further, a main stand 10 and a side stand or kick stand 11 are pivoted to the lower rear part of the vehicle body 7.

Figure 2:
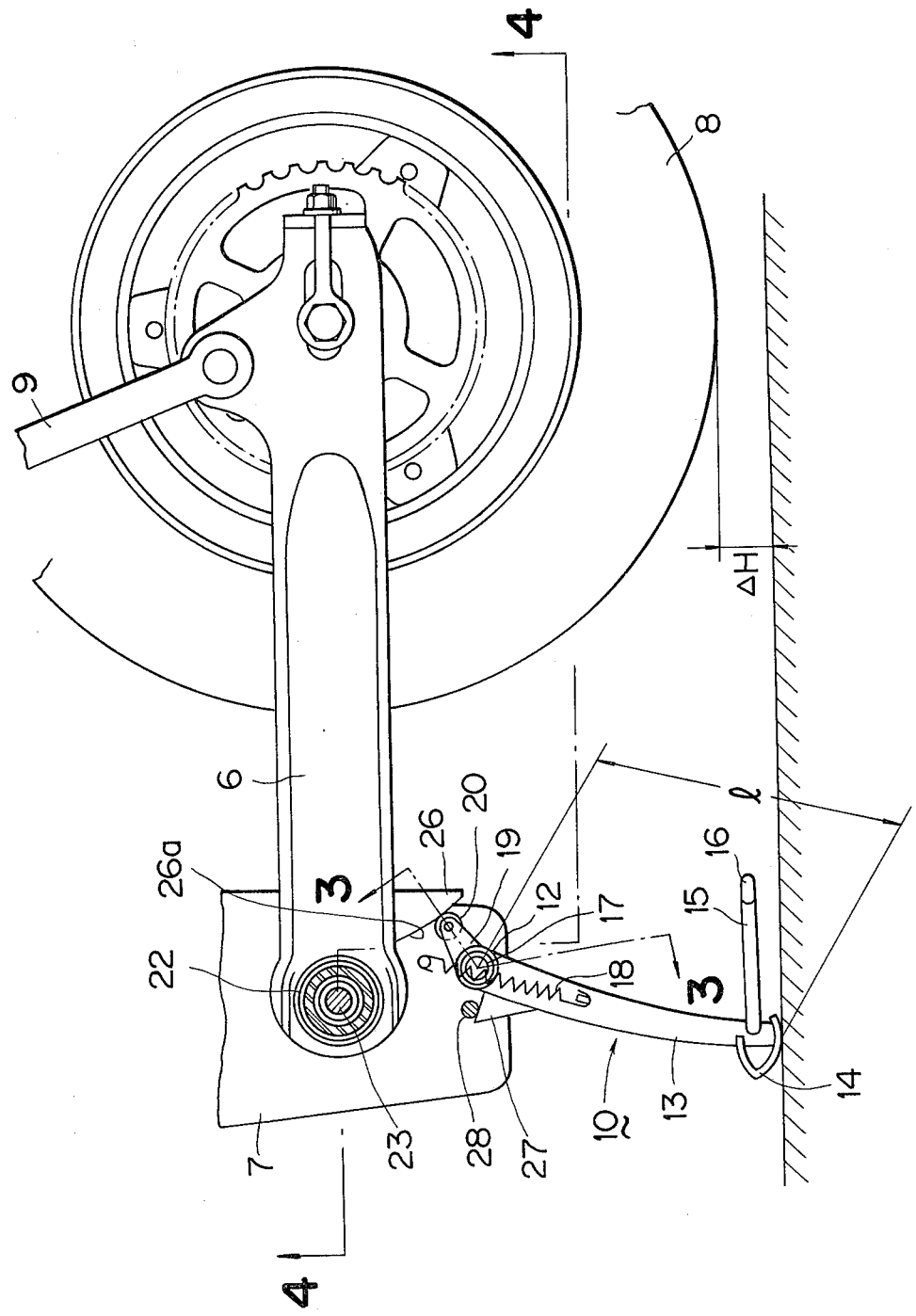
FIG. 2 is an enlarged side view of a principal part of the motorcycle of FIG. 1, showing a stand device embodying the present invention.
Figure 3:
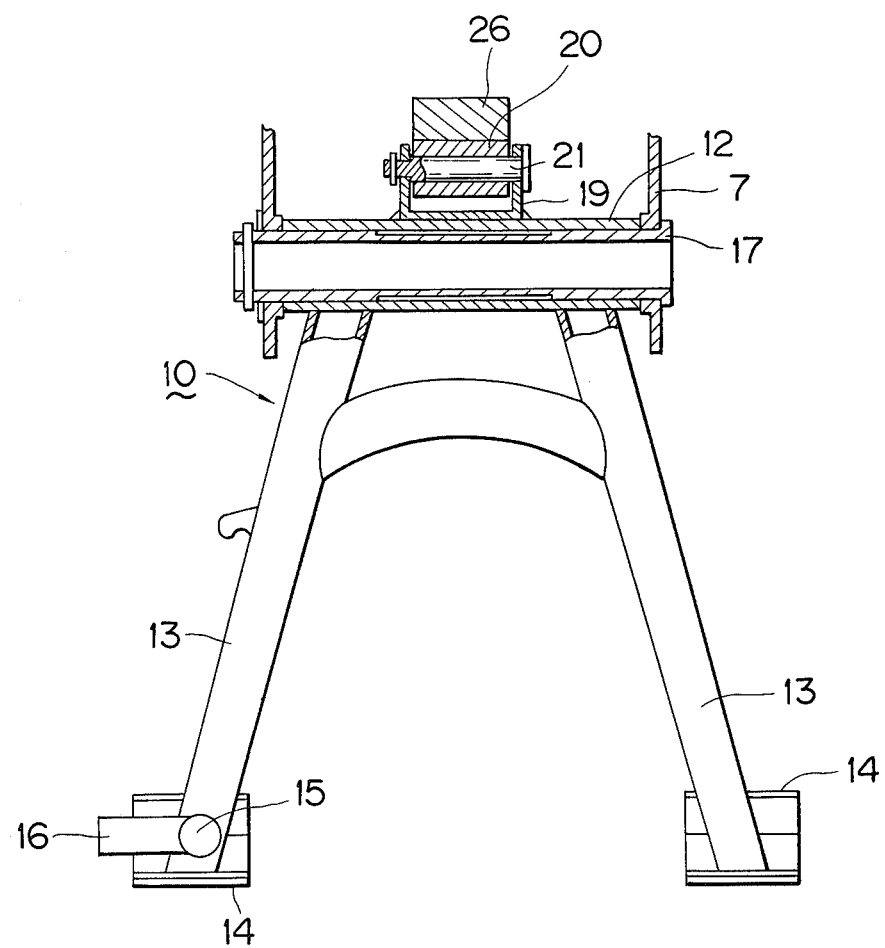
FIG. 3 is a sectional view taken along line 3—3 of FIG. 2.
Figure 4:
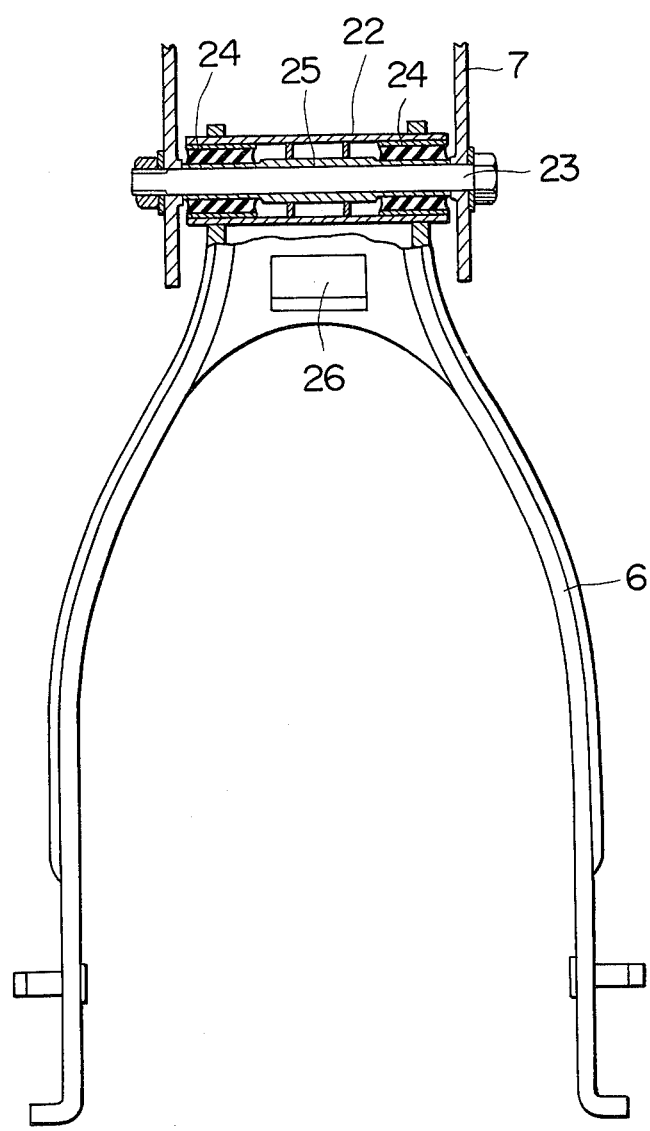
FIG. 4 is a sectional view taken along line 4—4 of FIG. 2.

Referring now to FIGS. 2 through 4, there are shown details of construction of the main stand 10 according to the invention, as well as its surrounding structure. The main stand 10 comprises respective right and left main pipes 13 fixed at the upper ends thereof to a pivot pipe 12, tread plates 14 which are substantially U-shaped in a side view and are fixed to the lower ends of the main pipes 13, a rearwardly extending tread arm 15 fixed to the lower end portion of one main pipe 13 (the left-hand main pipe 13 in FIG. 3), and a pedal 16 fixed to the rear end of the tread arm 15. The main stand 10 is pivotably attached to the body 7 by means of a shaft 17 through the pivot pipe 12, and a return spring 18 is tensioned between the main stand 10 and the body 7, whereby the main stand 10, when disposed in its raised position, is held in such position.

An engaging arm 19 is fixed to an axial central position of the pivot pipe 12 on the side opposite to the fixed side of the main pipe 13, and to a tip end portion of the arm 19 is pivotably attached a cam roller 20 by means of a pin 21.

As shown in FIGS. 2 and 4, the rear fork 6 is pivotably attached to the vehicle body 7 by means of a bolt 23 extending through a pivot pipe 22. Numerals 24 and 25 in FIG. 4 designate rubber bushings and a spacer, respectively. Connected to the rear end of the rear fork 6 is the rear wheel 8 and the rear cushion unit 9 having an upper end thereof connected to the vehicle body 7. A cam 26 is fixed to the lower surface of the rear fork 6 in a position proximal to the pivoted portion of the rear fork 6, cam 26 having an obliquely downwardly and rearwardly inclined profiling surface 26a in the form of a convex curved surface as shown in FIG. 2.

During the downwardly pivoting motion of the main stand 10, along with a pivotal movement of the main pipes 13 and a consequent pivotal movement of the engaging arm 19 about the shaft 17, the cam roller 20 pivoted to the tip end portion of the engaging arm 19 abuts and engages the profiling surface 26a of the cam 26. The pivotal movement of the main stand 10 is continued until a stopper 27 having a substantially triangular side portion abuts a stopper pin 28 projecting from the vehicle body 7.

A description of the operation of the stand device of the present invention is set forth hereinbelow.

Figure 5:
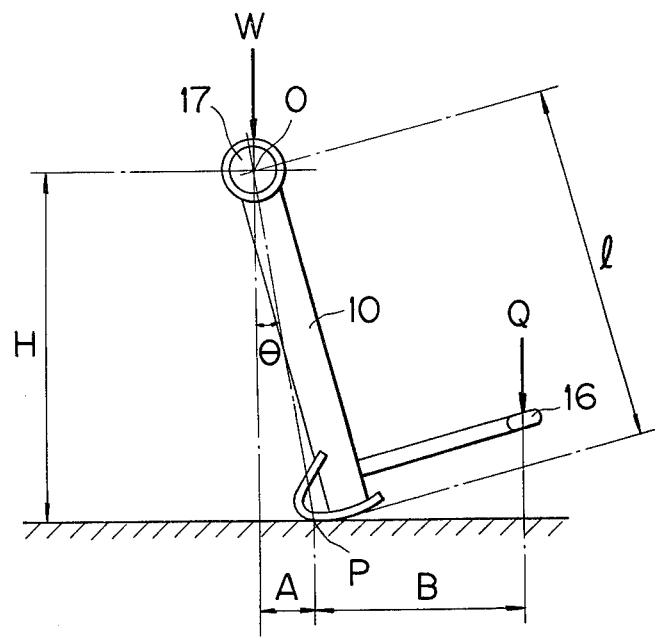
FIG. 5 is a side view of a main stand for illustrating the operation of the stand device in accordance with the invention.
Figure 7:
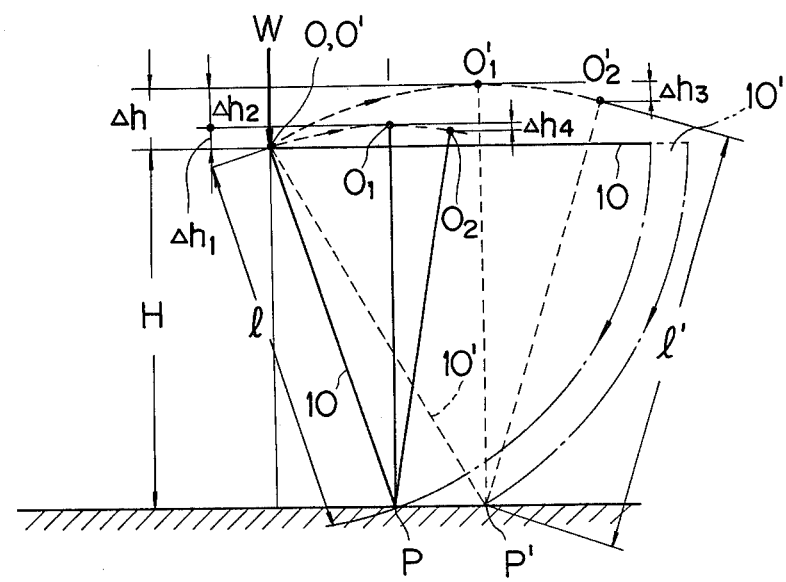
FIG. 7 is a view typically showing the operation of the main stand in accordance with the present invention as contrasted with that of a conventional main stand.

When it is desired to downwardly erect the main stand 10, the pedal 16 is depressed by the operator's foot, and the main stand 10 rotates in a clockwise direction about the shaft 17 in FIG. 2 and the tread plate 14 first contacts the ground, as shown in FIG. 5. As the pedal 16 is further depressed, the vehicle body 7 is lifted up while defining an arcuate locus about the contact point P with the length l of the main pipe as the radius (FIG. 7). The lift amount at this time is assumed to be $\Delta h_1$. At the same time, when the main stand 10 rotates at a preset angle, the cam roller 20 abuts and engages the profiling surface 26a of the cam 26 and thereafter, as interlocked with the pivotal movement of the main stand 10, the cam roller 20 rolls along the profiling surface 26a of the cam 26, thus causing the rear fork 6 to pivot in a counterclockwise direction in FIG. 2 about the bolt 23 against the resilient force of the rear cushion unit 9. Thus, the rear wheel 8 connected to the rear fork 6 is moved upwardly with respect to the vehicle body 7. The amount of upward movement of the rear wheel 8 at this time is assumed to be $\Delta h_2$ in FIG. 7.

After the main stand 10 has thus been brought to stand substantially upright, it is rotated by virtue of the weight of the motorcycle itself until it stops in the position where the stopper 27 abuts the stopper pin 28. The downward erection of the main stand 10 is then complete.

In the above-described embodiment of the invention, the wheel raising mechanism for raising the rear wheel 8 comprises the engaging arm 19, cam roller 20 and cam 26, however, it will be understood that such mechanism may alternatively be constructed of any other suitable elements.

In motorcycles or the like, while the main stand is standing up, it is necessary to ensure a certain spacing between the rear wheel and the ground. It is here assumed that such certain spacing is equal to $\Delta H$ (FIG. 2) and that in order to maintain the spacing $\Delta H$ it is necessary to lift the vehicle body 7 by $\Delta h_1$ and raise the rear wheel 8 by $\Delta h_2$ (FIG. 7). In conventional main stands, because they are not provided with the above-described wheel raising mechanism, it has been necessary to lift the vehicle body by an amount corresponding to the sum $\Delta h$ (equal to $\Delta h_1 + \Delta h_2$) of the foregoing $\Delta h_1$ and $\Delta h_2$ in order to maintain the same amount of spacing $\Delta H$ between the rear wheel and the ground. On the other hand, in the main stand 10 according to the present invention, the amount corresponding to $\Delta h_2$ is attained by the wheel raising mechanism and consequently the main stand length l can be set to be substantially shorter than the length of conventional stands.

Figure 6:
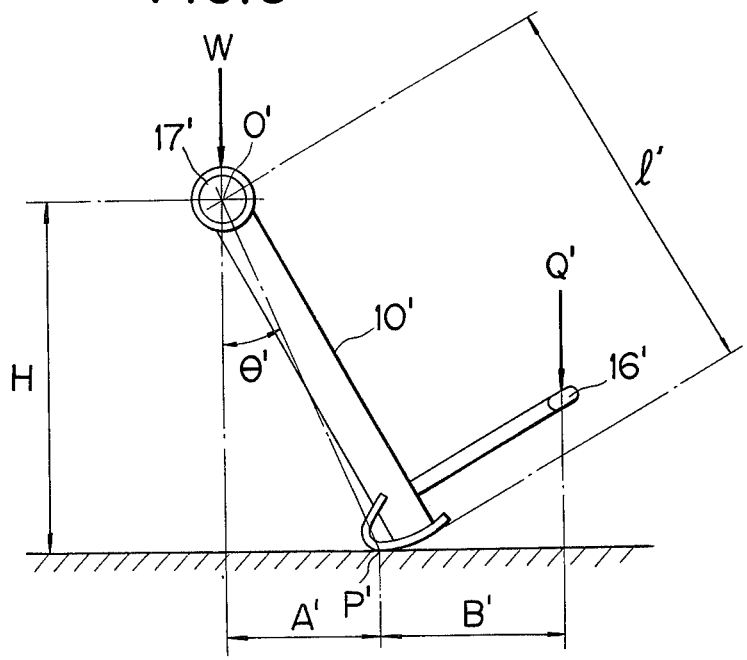
FIG. 6 is a view similar to FIG. 5 for illustrating the operation of a conventional stand device.

The following description relates to the effect obtained by shortening the main stand length l with reference to FIGS. 5 and 6, and also relates to the principles of operation of the present invention.

FIG. 5 is a side view of the main stand for illustrating the operation of the stand device in accordance with the present invention, and FIG. 6 is a view similar to FIG. 5 for illustrating the operation of a conventional stand device.

In both main stands 10 and 10', as respectively shown in FIGS. 5 and 6, the height from the ground of centers O and O' of the rotating shafts 17 and 17' thereof is assumed to be H, and both main stand lengths are assumed to be l and l', provided l is less than l'. Further, if the contact points of the main stands 10 and 10' with the ground are P and P', respectively, and the angles of straight lines connecting the contact points P and P' with the shaft centers O and O', respectively, with respect to vertical lines passing through the shaft centers O and O' are assumed to be $\theta$ and $\theta'$, then the angles $\theta$ and $\theta'$ are represented by the following equations:

$$\theta = \cos^{-1}(H/l) \quad (1)$$

$$\theta' = \cos^{-1}(H/l') \quad (2)$$

Because l is less than l' as previously noted, it can be seen from the above equations (1) and (2) that $\theta$ and $\theta'$ are in the following relation:

$$\theta < \theta' \quad (3)$$

Strictly speaking, for l and l' in the above equations (1) and (2), the lengths of segments OP and O'P' should be taken, however, these segments were assumed to be substantially equal to l and l'.

If a partial weight of the motorcycle imposed on the shafts 17 and 17' of the main stands 10 and 10' is W and treading forces to be applied to the pedals 16 and 16' are Q and Q', respectively, and distances A,A' and B,B' are set as shown in FIGS. 5 and 6, it is necessary that Q and Q' satisfy the following conditions:

$$Q \geq (A/B)W \quad (4)$$

$$Q' \geq (A'/B')W \quad (5)$$

From FIGS. 5 and 6, $$(A/B) < (A'/B') \quad (6)$$

Therefore, $$Q < Q' \quad (7)$$

Accordingly, if the main stand length is set to be short, the force required to downwardly erect the stand can be decreased, i.e., the main stand can be erected relatively easily.

The amount of work necessary for the main stand erecting operation will be explained hereinbelow with reference to FIGS. 7 and 8 and in comparison with the amount of work required in erecting a conventional stand.

Figure 8:
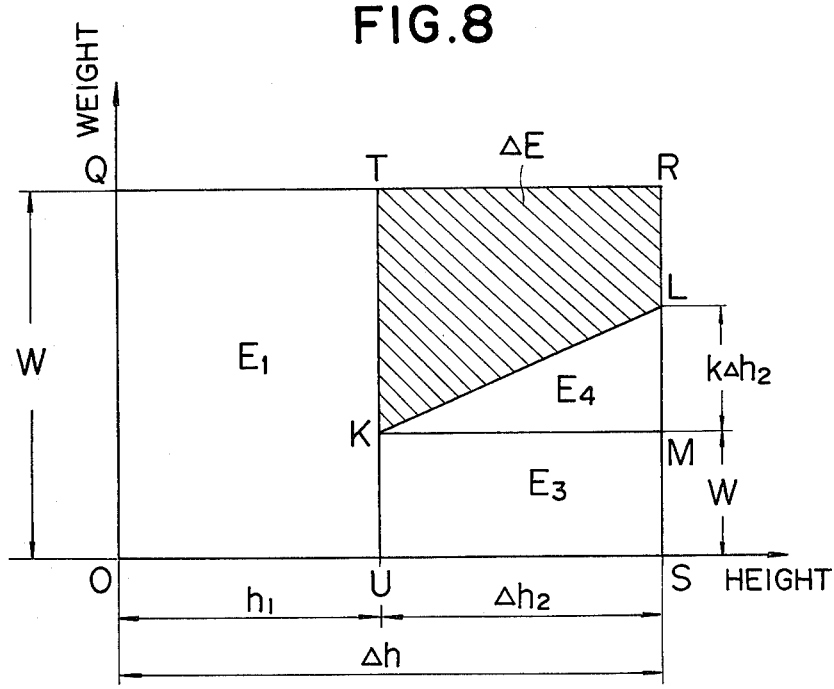
FIG. 8 illustrates the relationship between load and height with respect to operation of the main stand according to the present invention.

FIG. 7 typically shows the operation of the main stand 10 in accordance with the present invention and that of the conventional main stand 10', and FIG. 8 is a graph showing the relationship between load and height.

As shown in FIG. 7, if the conventional main stand 10' of length l' is rotated clockwise about the shaft center O' from its horizontal position, it contacts the ground at point P'. Then, if the pedal 16' is further depressed (FIG. 6), the shaft center O' rotates clockwise while defining an arcuate locus with radius l' about the point P', and in the position of point O'$_2$ past the top point O'$_1$ it is stopped by the stopper mechanism and the stand erecting operation is complete. Along with such movement from O' to O'$_1$ of the shaft center, the vehicle body moves upwardly by the height $\Delta h$ (equal to l'−H), and therefore, the following work must be performed against the partial load W of the motorcycle:

$$E' = W \cdot \Delta h \quad (8)$$

Such work E' is equal to the area of a square OQRS in FIG. 8.

While the shaft center moves from the top position $O'_1$ to the stop position $O'_2$, the following work E is performed by the partial pressure W:

$$E'_1 = W \cdot \Delta h_3 \tag{9}$$

On the other hand, while the main stand 10 in accordance with the present invention rotates clockwise about the contact point P and the shaft center O reaches the top position $O_1$, the vehicle body is lifted by $\Delta h_1$ (equal to $l - H$), and at this time the following amount of work $E_1$ must be performed:

$$E_1 = W \cdot \Delta h_1 \tag{10}$$

Such amount of work $E_1$ is represented by the area of a square OQTU in FIG. 8.

In the stand device of the present invention, the amount of work $E_2$ necessary for raising the rear wheel 8 by the following amount:

$$\Delta h_2 = \Delta h - \Delta h_1 = l - l' \tag{11}$$

is equal to the sum of work $E_3$ necessary for lifting the rear wheel 8 of weight W by $\Delta h_2$ and work $E_4$ which is performed against the resilience of the rear cushion unit 9, the work $E_3$ and $E_4$ being represented by the following equations:

$$E_3 = W \cdot \Delta h_2 \tag{12}$$

$$E_4 = \tfrac{1}{2} k (\Delta h_2)^2 \tag{13}$$

wherein k is a spring constant of the rear cushion spring.

The above work $E_3$ and $E_4$ is represented by the area of a square KMSU and that of a triangle KLM, respectively, in FIG. 8.

Therefore, the work E necessary for the stand erecting operation in the stand device of the present invention is represented by the following equation:

$$E = E_1 + E_3 + E_4 \tag{14}$$

Such amount of work E is less by $\Delta E$ represented by the following equation than the amount of work E' of equation (8) required in the conventional device, from which it will be understood that the apparatus and technique of the present invention permits easier operation of erecting the stand than heretofore required:

$$\Delta E = E - E' \tag{15}$$

Such saving of energy $\Delta E$ is equal to the oblique-lined area in FIG. 8, i.e., the area of a trapezoid TRLK.

When the ground contact angle $\theta$ of the main stand 10 shifts from 0 to a negative value, i.e., while the shaft center moves from the top position $O_1$ to the stop position $O_2$, if the work $E_5$ [equal to $W \cdot \Delta h_4$, provided $\Delta h_4$ is a vertical displacement amount at that time (see FIG. 7)] which is performed by the partial weight W of the vehicle body is applied to the energy for actuating the cam, it becomes possible to erect the main stand more easily.

The force Q necessary for erecting the main stand 10 shown in the foregoing equation (4) becomes smaller along with rotation of the main stand 10, i.e., along with a decrease of the ground contact angle $\theta$. Therefore, if the cam roller 20 is brought to commence its abutment and engagement with the profiling surface of the cam 26 when such force Q has become small to thereby lift the rear wheel 8, it becomes possible to easily effect the stand erecting operation from beginning to end with a substantially uniform force.

According to the present invention, as will be apparent from the above description, because at the time of downward pivoting motion of the main stand the rear wheel is moved upwardly with respect to the vehicle body as interlocked with a pivotal movement of the main stand, it becomes possible to shorten the main stand length, and the operating force not only can be decreased but also can be applied uniformly throughout the operation, whereby the stand erecting operation in motorcycles can be performed more easily than has been heretofore possible.

According to the device of the present invention, the main stand length is decreased and there is provided the wheel raising mechanism for moving the rear wheel upwardly with respect to the vehicle body as interlocked with a pivotal movement of the main stand at the time of downward pivoting motion of the stand. Therefore, the above operation of the invention can be effected while attaining the foregoing desirable effects.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. A stand device for two-wheeled vehicles, comprising:
   a vehicle body frame;
   a main stand member pivotally connected at a base end thereof to said vehicle body frame;
   a rear wheel support member pivotally connected at a base end thereof to said vehicle body frame; and
   urging means for moving said rear wheel support member pivotally upwardly in response to a pivotal downward movement of said main stand member, said urging means being disposed between said main stand member and said rear wheel support member.

2. A stand device according to claim 1, wherein:
   said rear wheel support member urging means substantially comprises a roller supported by either said main stand member or said rear wheel support member and a cam member integrally provided on the other of said members.

3. A stand device according to claim 2, wherein:
   said roller is attached to a tip end of an arm provided integrally with said main stand member; and
   said cam member is mounted on said rear wheel support member and is provided with a cam surface with which said roller is brought into abutment and engagement.

4. A stand device according to claim 3, wherein:
   at the time of a pivotal downward movement of said main stand member, said roller begins to abut and engage said cam surface when a ground contact angle $\theta$, defined by a line passing through a pivot shaft of said stand member and a ground contact point of said stand member with respect to a vertical line passing through said pivot shaft, has become relatively small.

5. A stand device according to claim 4, wherein:
   said roller begins to abut and engage said cam surface when said angle shifts from zero to a negative value.

* * * * *